United States Patent
Prevost et al.

(10) Patent No.: US 10,305,728 B2
(45) Date of Patent: May 28, 2019

(54) DISCOVERING, IDENTIFYING, AND CONFIGURING DEVICES WITH OPAQUE ADDRESSES IN THE INTERNET OF THINGS ENVIRONMENT

(71) Applicant: Assa Abloy AB, Stockholm (SE)

(72) Inventors: Sylvain Jacques Prevost, Austin, TX (US); Kapil Sachdeva, Round Rock, TX (US)

(73) Assignee: ASSA ABLOY AB, Stockholm (SE)

(*) Notice: Subject to any disclaimer, the term of this patent is extended or adjusted under 35 U.S.C. 154(b) by 0 days.

(21) Appl. No.: 15/017,022

(22) Filed: Feb. 5, 2016

(65) Prior Publication Data

US 2016/0254946 A1   Sep. 1, 2016

Related U.S. Application Data

(60) Provisional application No. 62/113,145, filed on Feb. 6, 2015.

(51) Int. Cl.
| | |
|---|---|
| *H04W 4/80* | (2018.01) |
| *H04L 12/24* | (2006.01) |
| *G08B 5/36* | (2006.01) |
| *G08B 3/00* | (2006.01) |
| *H04W 64/00* | (2009.01) |
| *H04B 17/318* | (2015.01) |

(Continued)

(52) U.S. Cl.
CPC .......... *H04L 41/0803* (2013.01); *G08B 3/00* (2013.01); *G08B 5/36* (2013.01); *H04B 17/318* (2015.01); *H04L 41/22* (2013.01); *H04W 4/008* (2013.01); *H04W 4/80* (2018.02); *H04W 12/06* (2013.01); *H04W 64/003* (2013.01); *H04M 2250/02* (2013.01)

(58) Field of Classification Search
CPC .... H04L 41/0803; H04L 41/22; H04W 12/06; H04W 4/008; H04W 64/003; H04W 84/18; H04W 4/005; G08B 3/00; G08B 5/36; H04B 17/318; H04M 2250/02
USPC ........................................................ 455/420
See application file for complete search history.

(56) References Cited

U.S. PATENT DOCUMENTS

| | | |
|---|---|---|
| 7,633,888 B1 | 12/2009 | Seifer |
| 2008/0137572 A1* | 6/2008 | Park ...................... G08C 17/02 370/310 |

(Continued)

FOREIGN PATENT DOCUMENTS

WO    WO 2016/196578    12/2016

OTHER PUBLICATIONS

Extended Search Report for European Patent Application No. 16154666.8, completed May 23, 2016 7 pages.

(Continued)

*Primary Examiner* — Marcus Hammonds
(74) *Attorney, Agent, or Firm* — Schwegman Lundberg & Woessner, P.A.

(57) ABSTRACT

A method and device for discovering, identifying, and configuring a particular one of a plurality of devices to be administered is described. The method and device facilitate these steps by eliminating the need for an administrator to know a specific MAC address or unique identifier for the device to be administered, and by eliminating the need to identify that specific MAC address or unique identifier in a list of MAC addresses or unique identifiers.

17 Claims, 6 Drawing Sheets

(51) Int. Cl.
*H04W 4/00* (2018.01)
*H04W 12/06* (2009.01)

(56) References Cited

U.S. PATENT DOCUMENTS

| | | | |
|---|---|---|---|
| 2008/0242220 A1* | 10/2008 | Wilson | H04M 1/7253 |
| | | | 455/3.04 |
| 2008/0247759 A1 | 10/2008 | Bahar | |
| 2014/0235269 A1 | 8/2014 | Ericsson et al. | |
| 2014/0378058 A1 | 12/2014 | Decuir et al. | |
| 2015/0304843 A1* | 10/2015 | Hillyard | H04W 12/06 |
| | | | 726/5 |
| 2015/0347114 A1* | 12/2015 | Yoon | G06F 8/61 |
| | | | 235/375 |
| 2015/0358768 A1* | 12/2015 | Luna | H04W 4/02 |
| | | | 455/456.1 |
| 2016/0087982 A1 | 3/2016 | Takano et al. | |
| 2016/0100014 A1* | 4/2016 | Hsieh | H04W 76/02 |
| | | | 709/208 |
| 2016/0224208 A1* | 8/2016 | Bugajski | G06F 3/04817 |
| 2016/0277204 A1* | 9/2016 | Kang | H04L 12/2809 |

OTHER PUBLICATIONS

Official Action for European Patent Application No. 16154666.8, dated Jul. 5, 2017 6 pages.
"European Application Serial No. 16154666.8, Communication Pursuant to Article 94(3) EPC Jan. 16, 2019", 7 pgs.

* cited by examiner

DISCOVERING, IDENTIFYING, AND CONFIGURING DEVICES WITH OPAQUE ADDRESSES IN THE INTERNET OF THINGS ENVIRONMENT

CROSS-REFERENCE TO RELATED APPLICATIONS

This application claims the benefit of U.S. Provisional Application No. 62/113,145, filed on Feb. 6, 2015, which application is hereby incorporated herein by reference in its entirety.

FIELD

This invention relates generally to systems and methods for the administration of devices with limited user interface elements that are part of a local communication environment.

BACKGROUND

As the Internet of Things grows, more and more uniquely identifiable embedded computing devices will require configuration, inspection, updating, and other administrative tasks. However, the hardware in which such devices are embedded may include limited user interface elements and, for security or design purposes or otherwise, may rely solely on wireless communication protocols and, therefore, lack a port for a wired communication interface. These characteristics create certain challenges for administrators seeking to configure, inspect, update, or perform other administrative tasks on the embedded computing device. A further challenge is presented when the device to be administered is one of a plurality of similar devices and is not visibly distinguishable from the plurality of similar devices.

SUMMARY

For example, physical access control systems utilize one or more readers affixed near a door, gate, or other access point. Each reader often contains a uniquely identifiable computing device, to authenticate credentials presented thereto and to grant access to the holders of authenticated credentials. Credentials are typically embedded in a physical card, although they may also be embedded in mobile phones or other portable electronic devices. The authentication process typically requires security keys to be stored in the reader that are used to retrieve credentials from the physical card, smart phone, or other medium in which they are embedded and to verify the credentials.

Typical reader devices have very limited user interface elements, such as a light-emitting diode (LED) and/or a beeper, buzzer, or other audio element. Typical readers are programmed to respond to a given event (i.e. a successful authentication, a failed authentication, a fatal error, an anti-passback sequence, etc.) with a corresponding sequence of light colors, light flashes, and/or beeps.

Often, the configuration of a reader is customized to fit the requirements or preferences of the end user. For example, the security keys in readers are typically unique to a given customer. Those security keys are loaded into the reader as part of the configuration/initialization process, often after the reader has been deployed to the customer's premises. Additionally, the reader designer or manufacturer may release updated software or firmware that adds new features and provides bug fixes, which typically would also need to be installed on readers that have already been deployed to customer premises. Administrative tasks such as configuring the reader, updating the reader's software or firmware, inspecting the reader as part of a scheduled inspection program or after a malfunction, downloading data from the reader, and so forth can be difficult due to the limited user interface elements of typical readers.

To simplify the administration of readers, including initial configuration with appropriate security keys and installation of firmware updates, it is desirable to use a separate administrative computing device that has more extensive user interface elements than a typical reader and that can be used without compromising the security provided by the readers or by the physical access control system of which the readers are a part. For example, smart phones and tablets may be used for administrative tasks, as they generally contain a detailed user interface, can be customized with reader administration apps or similar solutions, and can typically communicate with readers over a wireless protocol. Preferably, an administrative computing device has a processor, a memory for storing programs to accomplish needed administrative functions and other tasks, a wireless communication radio, and a graphical user interface.

Even when using a smart phone, tablet, or other administrative computing device for reader administration, identifying and connecting to the correct reader when multiple readers are discoverable by the administrative computing device can be a difficult and time consuming task. Readers are often identifiable and/or distinguishable only by a MAC address. Typically, an administrator must select the proper MAC address from a list of all available MAC addresses displayed on the smart phone or tablet. But MAC addresses are number sequences that are not user friendly, for example because they are not easy to remember, to compare, or to distinguish. Moreover, MAC addresses often are not printed anywhere on the body of the reader or, if they are printed on the body of the reader, are not easily visible.

The present disclosure describes solutions to the above-described challenges that avoid the need for reading and/or comparing MAC addresses, and for printing MAC addresses on a reader body.

According to one embodiment of the present disclosure, a method for discovering, identifying, connecting to, and configuring devices with opaque addresses in the Internet of Things environment comprises scanning, with an administrative computing device, for wireless signals in wireless communication range of the administrative computing device; displaying, on the administrative computing device, a unique object associated with each wireless signal received from a plurality of uniquely identifiable computing devices detected during the scanning step; selecting one of the unique objects displayed on the administrative computing device; establishing a wireless connection between the administrative computing device and the uniquely identifiable computing device that produced the wireless signal associated with the selected unique object; and sending over the wireless connection, from the administrative computing device to the uniquely identifiable computing device, a command to be executed by the uniquely identifiable computing device. In some embodiments, the method further comprises performing an administrative task on the uniquely identifiable computing device.

The administrative computing device may be, for example, a smart phone or tablet, although it may also be a laptop computer or any other device having a processor, a computer memory, and a wireless transceiver.

Embodiments of the present disclosure are utilized with physical access control systems. Thus, in embodiments, the uniquely identifiable computing devices are readers associating with a physical access control system. The readers may be visually indistinguishable from one another, and may lack user interface terminals from which the unique identity of the readers can be discerned. Only by scanning for wireless signals transmitted by the readers using an administrative computing device or other device can the readers be uniquely identified, such that a specific reader can be configured as necessary.

Also in embodiments of the present disclosure, the wireless signals utilize the Bluetooth® low energy protocol. In some embodiments, the wireless signals utilize a plurality of wireless protocols. Additionally, the unique objects displayed on the administrative computing device may be ordered by the strength of the wireless signal, as detected by the administrative computing device during the scanning step. The unique objects may be, for example, MAC addresses associated each of the uniquely identifiable computing devices.

In some embodiments, the command sent by the administrative computing device to the uniquely identifiable computing device causes the uniquely identifiable computing device to execute one or more identification tasks. These tasks may involve, for example, activation of an LED or other light source, activation of a speaker or other sound source, or some combination thereof. In embodiments, the command causes the uniquely identifiable computing device to perform a sequence of identification tasks, such as flashing a light in a certain sequence, beeping or chirping in a certain sequence, changing the color or intensity of a light in a certain sequence, and so forth.

Also according to some embodiments of the present disclosure, the establishing a wireless connection step occurs after the selecting step without further input from a user of the administrative computing device. In such embodiments, the user's selection of a unique object corresponding to a uniquely identifiable computing device causes the administrative computing device to automatically connect to that uniquely identifiable computing device.

The foregoing method may also comprise, in some embodiments, choosing a targeted uniquely identifiable computing device from among the plurality of uniquely identifiable computing devices, and determining whether the targeted uniquely identifiable computing device performs the command. For example, the command sent by the administrative computing device to the uniquely identifiable computing device may allow the user of the administrative computing device to determine whether the connected uniquely identifiable computing device is the targeted uniquely identifiable computing device. If it is not, then the scanning, displaying, selecting, establishing, and sending steps may be repeated until the targeted uniquely identifiable computing device performs the command.

According to another embodiment of the present disclosure, a method for connecting to a specific reader in a physical access control system having a plurality of readers comprises scanning, with a computing device, for wireless signals from among a plurality of readers; receiving, on the computing device and from each of the plurality of readers, an object that uniquely identifies the reader among the plurality of readers; displaying, on the computing device, each unique object received from each of the plurality of readers, wherein the unique objects are displayed on the computing device in an ordered set thereby enabling a user of the computing device to select one among the plurality of readers by selecting one of the unique objects; establishing a wireless connection between the computing device and a selected reader; and sending over the wireless connection, from the computing device to the reader, a command to perform a sequence of tasks. The unique object may be, in some embodiments, a MAC address.

The foregoing method may further comprise choosing a targeted reader from among the plurality of readers; and determining whether the targeted reader performs the sequence of tasks. The method may also comprise generating a response at the selected reader, the response including at least one of an audible and visual display created by the selected reader for the user to confirm that the responding reader corresponds to the selected reader.

In still another embodiment of the present disclosure, a device for administering uniquely identifiable computing devices, may comprising a wireless communication radio; a graphical user interface; a processor; and a memory containing instructions for performing an administrative task and for causing the device to scan for wireless signals received from among a plurality of uniquely identifiable computing devices, display a unique object associated with each wireless signal received from among the plurality of uniquely identifiable computing devices detected during the scanning step, receive user input selecting one of the displayed unique objects, establish a wireless connection with the uniquely identifiable computing device that produced the wireless signal associated with the selected one of the displayed unique objects, and send, over the wireless connection, a command to perform a sequence of identification tasks.

In embodiments, the instructions contained within the memory of the foregoing device may further cause the device to perform an administrative function on the uniquely identifiable computing device with which the wireless connection is established. Moreover, the sequence of identification tasks may comprise at least one of generating a sound and displaying a light. And, the display of unique objects may be ordered according the signal strength of the wireless signal with which each unique object is associated.

Additional details regarding these and other embodiments of the present disclosure are provided in the detailed description below.

BRIEF DESCRIPTION OF THE DRAWINGS

In the drawings, like reference characters generally refer to like figures and structural elements throughout the various figures. The following drawings are illustrative of embodiments of the invention and are not meant to limit the scope of the invention as encompassed by the claims. The foregoing features of this invention, as well as the invention itself, may be more fully understood from the following description of the drawings, in which:

DETAILED DESCRIPTION

Figure 1:
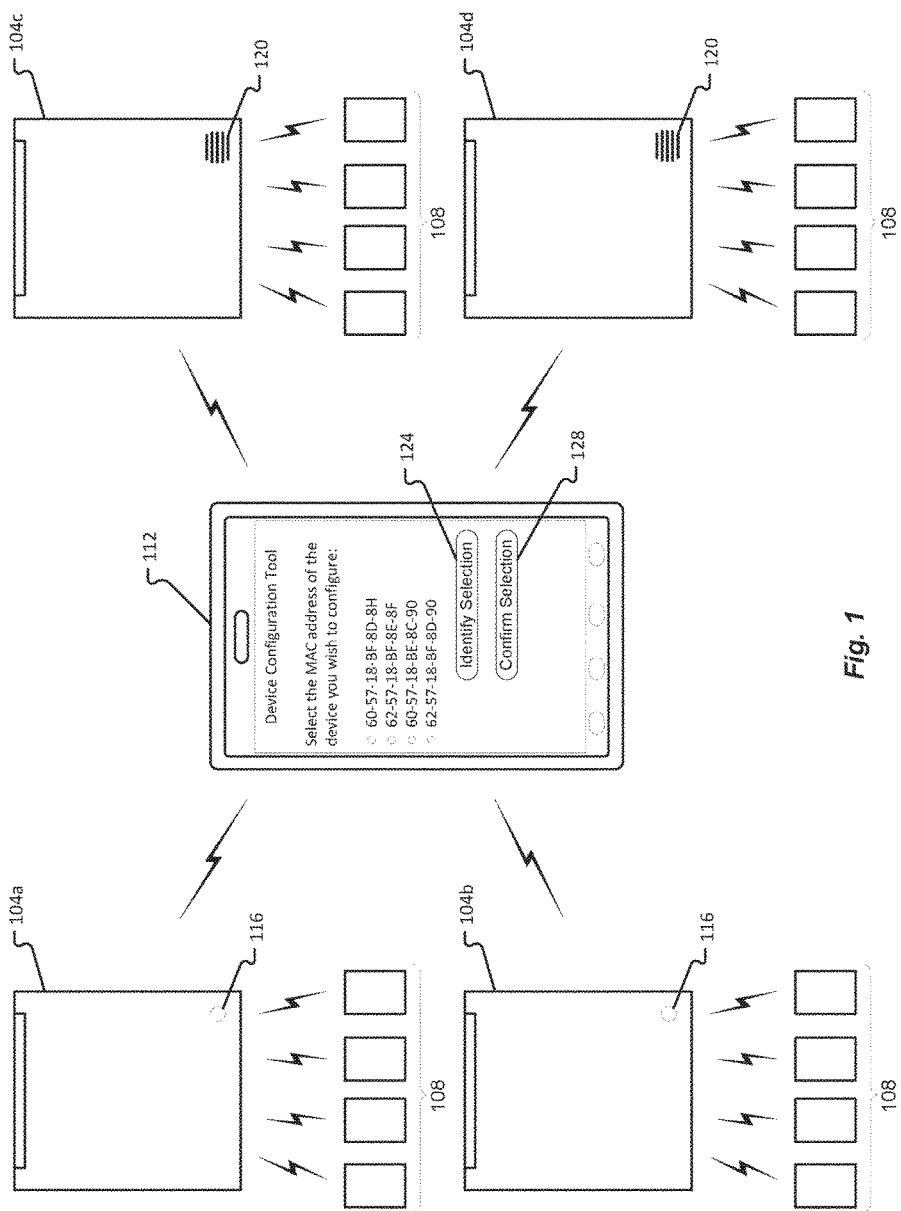
FIG. 1 is a block diagram depicting aspects of one embodiment of the present disclosure.

As shown in FIG. 1, physical access control system readers 104*a-d* (and/or other uniquely identifiable computing devices) may be enabled to communicate with other devices (e.g. smartcards 108) wirelessly using the Bluetooth® low energy protocol (referred to herein as "BLE"). (Bluetooth® is a registered trademark of Bluetooth SIG, Inc.) A similarly enabled administrative computing device 112, such as a smart phone or tablet, may be programmed to communicate with readers such as reader 104 over BLE, so as to perform any necessary administrative tasks. These may include authentication, configuration, firmware update, data download, and/or inspection. Furthermore, other types of proximity-based communication protocols such as traditional Bluetooth, WiFi, ZigBee, etc. may be utilized in addition to or in lieu of BLE. In other words, BLE is but one of many wireless protocols that can be used to obtain the benefits described herein.

BLE, like many other wireless protocols, utilizes MAC addresses to ensure that data is sent to the proper location. The BLE-enabled readers 104*a-d* are each assigned a unique MAC address. Whether for reasons of security, cost, appearance, or otherwise, however, the unique MAC addresses of readers 104*a-d* are not displayed anywhere on the readers 104*a-d* themselves, nor are readers 104*a-d* equipped with any user input terminal (or, at least, any accessible user input terminals) other than BLE. Thus, for example, readers 104*a-d* do not have any keys, buttons, receptacles, ports, touchpads, touchscreens, etc. In some embodiments, readers 104*a-d* may have user input terminals for biometric screening purposes, but these biometric user input terminals do not allow users to perform any function with readers 104*a-d* other than verifying the user's identity using biometric information provided to the biometric user input terminals. Readers 104*a-d* do have, however, one or more user interface elements, such as an LED light 116, or a speaker 120.

Figure 2:
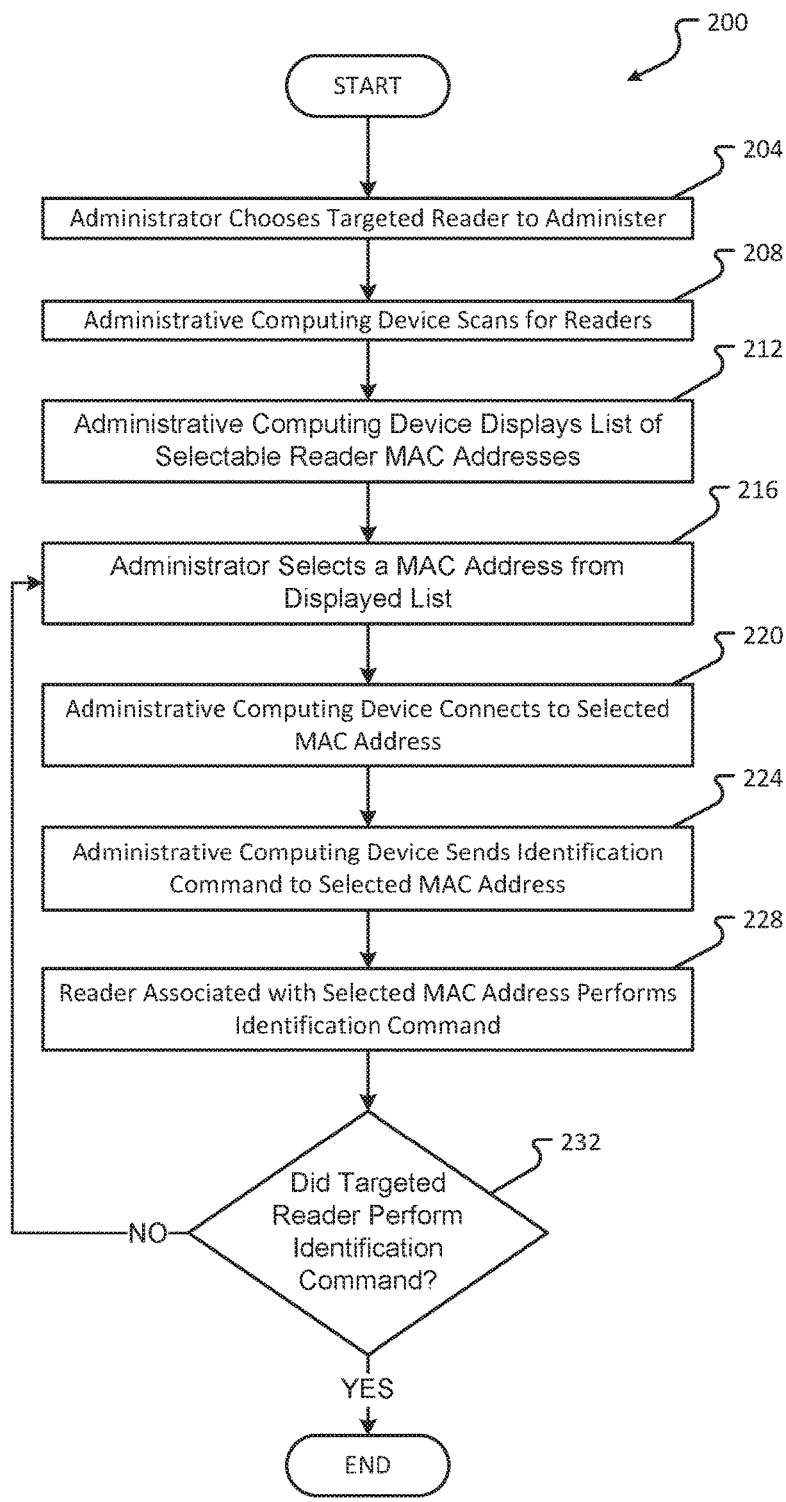
FIG. 2 is a flow diagram depicting a method according to an embodiment of the present disclosure.

Using the BLE-enabled administrative computing device 112, an administrator can easily identify the MAC address associated with a reader targeted for administration by utilizing the process depicted in FIG. 2 and described below. It is noted that one or more of the steps depicted in FIG. 2 may not necessarily be required. Moreover, the depicted steps or a subset thereof may be performed in various orders or in parallel.

In a process 200 depicted in FIG. 2, an administrator first locates a reader to be administered, referred to hereinafter as a targeted reader, in step 204. The administration may comprise initial configuration, reconfiguration (whether of a single setting, of every setting, or of some settings), installation of software or firmware, updating software or firmware, downloading data stored in reader memory, or any other operation which may be conducted via a wireless connection. In step 208, the administrative computing device 112 conducts a wireless signal scan for all discoverable wireless signals within range. In embodiments, if the reader or readers to be administered utilize BLE, the administrative computing device scans for BLE signals. In some embodiments, the administrator may select, on the administrative computing device 112, one or more specific types of signals for which the administrative computing device then scans. This selection may be based on the signal type of the targeted reader, or the expected signal type of the targeted reader. In step 212, the administrative computing device 112 displays to the administrator a list of all discovered wireless signals. In the present embodiment, these wireless signals are represented by MAC addresses, as depicted on the administrative computing device 112 of FIG. 1, although in other embodiments the wireless signals may be represented in other ways. The MAC address or other displayed representation of each wireless signal is presented in a format that allows each representation of a wireless signal (e.g. the MAC address of each wireless signal) to be individually selected. This allows the administrator, in step 216, to select a MAC address from the displayed list. The administrator may, for example, press a digital button corresponding to the selected MAC address. The administrative computing device 112 then connects to the reader or other device having the selected MAC address in step 220. The connection may occur without further administrator input, or may require further input from the administrator.

Once the administrative computing device 112 has connected to the device having the selected MAC address, the administrative computing device 112 sends an identification command to the connected device, as shown in step 224. This identification command may be sent automatically, or it may be sent upon input from the administrator (e.g., the administrator may press a button, such as the "Identify Selection" button 124 in FIG. 1, on the administrative computing device that causes the administrative computing device to send the identification command). The purpose of the identification command is to cause the connected device (e.g. the reader associated with the selected MAC address) to perform a sequence of identification tasks, which may include displaying one or more LED flashes and/or LED colors and/or playing one or more sounds (e.g., buzzers buzzing). In step 228, the connected device performs the sequence of identification tasks per the device's command, allowing the administrator to determine, in step 232, whether the reader to which the administrative computing device has connected is the targeted reader. If not, the administrator selects another MAC address (or other representation of a wireless signal) from the list displayed on the device, and repeats the above steps until the targeted reader has been identified. Once the targeted reader has been identified, the administrator can proceed to use the administrative computing device to perform the needed administrative functions. This may require the administrator to indicate to the administrative computing device that it is connected to the proper reader, such as by pressing the "Confirm Selection" button 128 of administrative computing device 112 in FIG. 1.

Using this process, an administrator can visually and/or aurally determine whether the reader performing the identification command is the targeted reader, without knowing the MAC address of the targeted reader and without having to compare the MAC address of the targeted reader with a list of discoverable MAC addresses. Although the foregoing embodiment describes an identification command causing the connected device to perform a sequence of identification tasks, in other embodiments the identification command may cause the connected device to perform only a single identification task.

Figure 3:
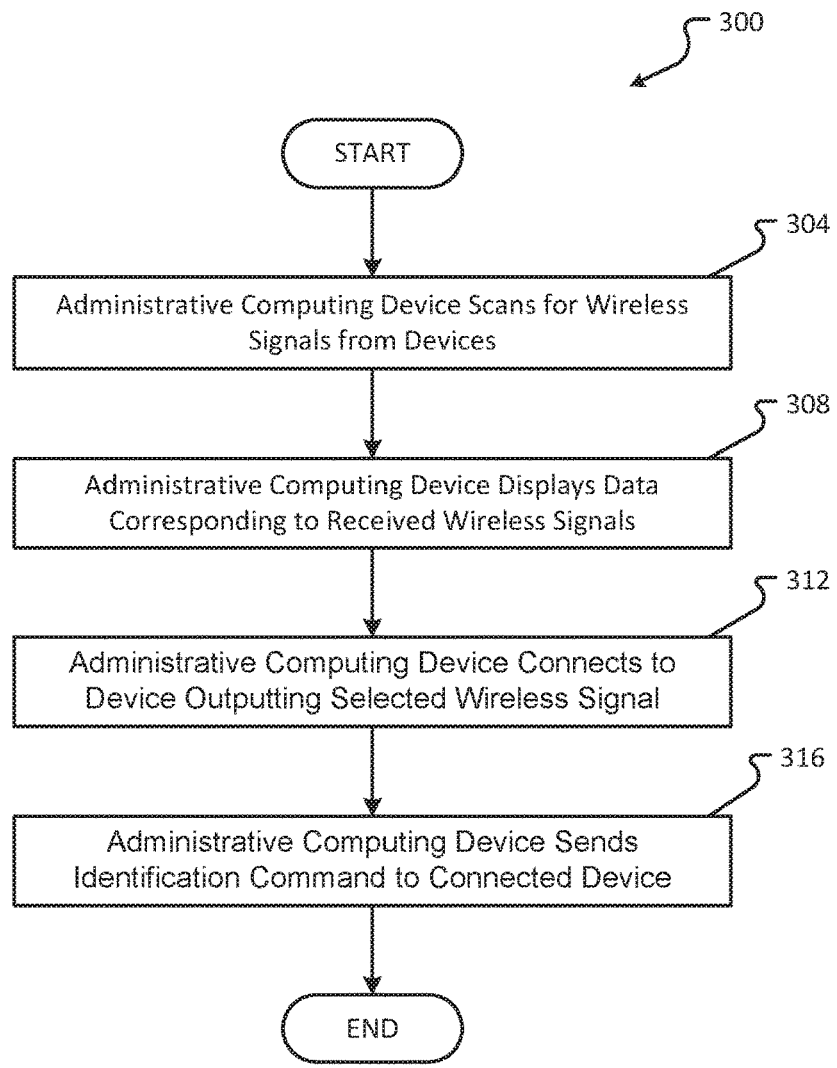
FIG. 3 is a flow diagram depicting another method according to an embodiment of the present disclosure.

FIG. 3 displays another process 300 in accordance with embodiments of the present disclosure. In this embodiment, an administrative computing device such as administrative computing device 112 scans for wireless signals from devices within wireless communication range in step 304. The devices may be, for example, readers of a physical access control system. The devices may also be, however, any device having a processor and wireless communication capability.

Once the administrative computing device has completed the scan (or while the scan is in progress), the administrative computing device displays data corresponding to wireless signals received during the scan in step 308. The data may be, for example, a MAC address associated with each wireless signal, a signal strength associated with each wireless signal, a type of each wireless signal, or random data associated by the administrative computing device with a particular wireless signal, such as a shape, a name, a number, a color, and so forth. In embodiments, the administrative computing device displays data corresponding to every wireless signal that it received during step 304, while in other embodiments, the administrative computing device displays data corresponding to only a subset of the wireless signals that it received during step 304. The latter embodiment may be preferable, for example, when the device to be configured (e.g. the device to which the administrative computing device ultimately needs to be connected) utilizes a known wireless signal type; then, the administrative computing device may display only wireless signals having that particular wireless signal type.

In step 312, the administrative computing device connects to the device transmitting a selected wireless signal. The selected wireless signal may be selected by a user of the administrative computing device, e.g. by selecting data corresponding to that particular wireless signal from the data displayed on the administrative computing device in step 308. In embodiments, the selected wireless signal may be determined by a predetermined criterion or algorithm. For example, the administrative computing device may be programmed to automatically connect to the device transmitting the wireless signal having the strongest signal strength, or it may be programmed to automatically connect, in sequence, to each device transmitting a wireless signal received during the scanning step 304.

After connecting to a device outputting a selected wireless signal, the administrative computing device sends, in step 316, an identification command to the connected device. The identification command may be any command that causes the connected device to perform an identification task, e.g. a task that will allow a user of the administrative computing device, or the administrative computing device itself, to determine whether the connected device is the device to which the administrative computing device needs to be connected to perform a needed administrative task or function. Exemplary identification tasks include, without limitation, playing a sound or a sequence of sounds, flashing a light once or in a given sequence, changing the color of a light once or in a given sequence, or any combination of the foregoing.

Figure 4:
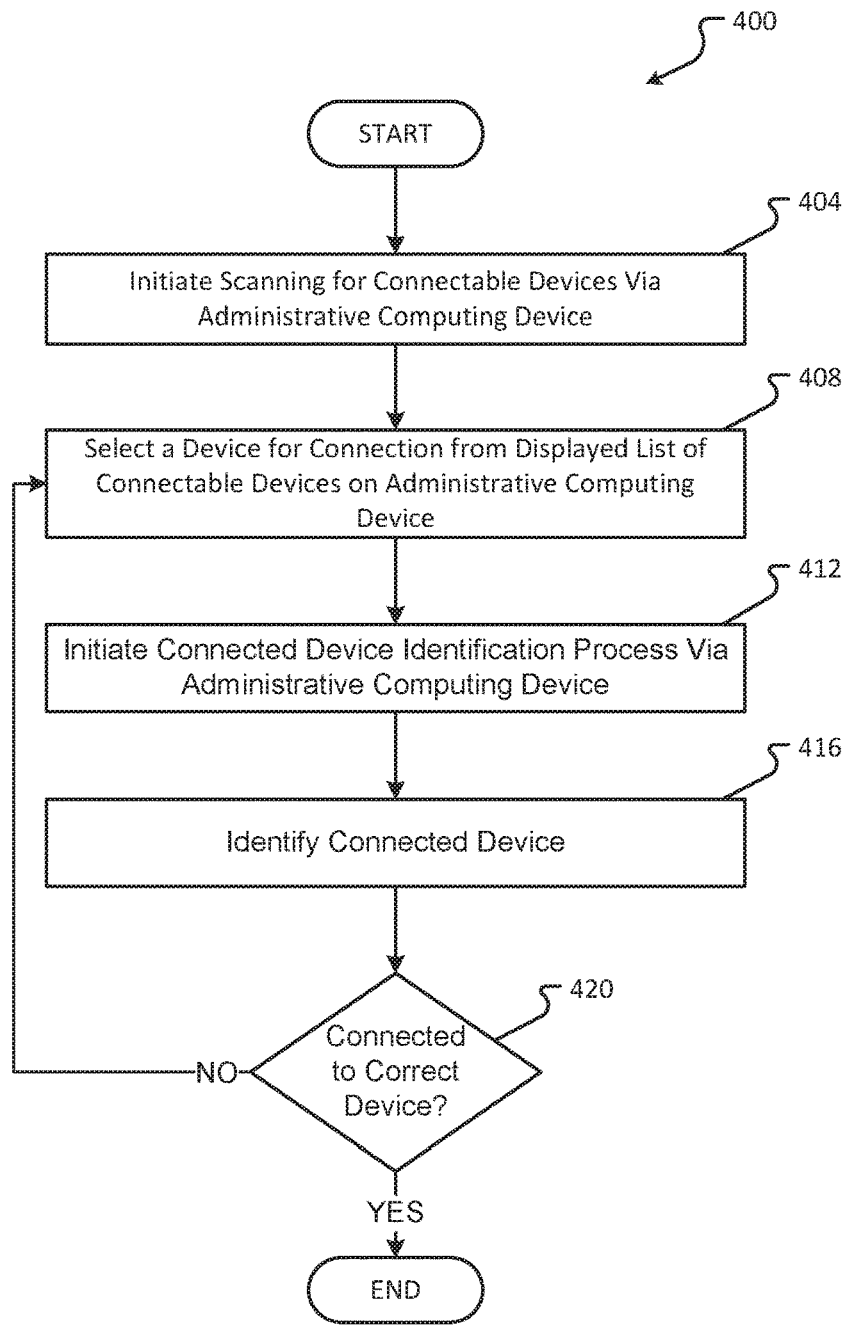
FIG. 4 is a flow diagram depicting another method according to an embodiment of the present disclosure.

In yet another embodiment according to the present disclosure, a process 400 such as that depicted in FIG. 4 begins in step 404 with an administrator initiating scanning for connectable devices via an administrative computing device. Scanning for connectable devices may comprise scanning for wireless signals, scanning for wireless signals of a particular type, and/or communicating with the source of wireless signals to determine whether connection therewith is possible. In step 408, the administrator selects a device for connection from a displayed list of connectable devices on the administrative computing device. In embodiments, the displayed list of connectable devices comprises a list of information corresponding to the connectable devices, and the correspondence between the information listed and the connectable devices may be inherent (e.g. the information may be the MAC addresses of the connectable devices, or the signal strength of the wireless signal received from the connectable devices, or a distance from the administrative computing device to the connected devices calculated based on wireless signal strength) or assigned (e.g. the information may be a random name, shape, color, number, or other indicator assigned by the administrative computing device to correspond to each connectable device). The administrator's selection of a device for connection causes the administrative computing device to connect to the selected device.

Once the administrator has selected a connectable device, the administrator initiates, in step 412, a process of identifying the connected device via the administrative computing device. This process involves sending, from the administrative computing device, an identification command to the connected device that causes the connected device to perform one or more identification tasks, which may be any of the identification tasks described herein. In step 416, the administrator identifies which device is performing the identification tasks, and determines whether the device performing the identification tasks is the device to which the administrative computing device needs to be connected in order to perform needed administrative functions on the device. If not, the administrator returns to step 408 to select a new device for connection and repeat the subsequent steps. Once the administrative computing device is connected to the correct device, as confirmed by the administrator upon performance by the correct device of the identification tasks, the administrator can use the administrative computing device to complete the needed administrative functions on the connected device.

The methods described above are not limited to administration of readers in physical access control systems, but may be used in any environment where one of a plurality of uniquely identifiable computing devices needs to be configured, initialized, updated, inspected, or otherwise administered, especially (but not only) when the devices have limited user interface elements, have essentially identical physical appearances, are identified only by MAC addresses or other difficult-to-distinguish character strings, or, for design or security purposes or otherwise, have no readily accessible terminals or ports for establishing a wired connection. Such devices are likely to, but need not, form part of the Internet of Things.

In embodiments, wireless communication protocols other than BLE may be used. In embodiments, the administrative computing device may scan for devices to be administered using a plurality of wireless protocols rather than just one protocol.

In embodiments, the administrator may use an administrative computing device other than a smart phone or tablet, such as a laptop computer or an electronic device designed specifically for administering readers or other embedded, uniquely identifiable computing devices. In embodiments, the computing devices may be uniquely identifiable using a network address other than a MAC address, or using other information obtained from or characteristic of the wireless signals transmitted by the computing devices.

Referring now to FIGS. 5-8, in embodiments, particularly when the administrator does not need to see or know the actual address of the devices to be administered, the administrative computing device may display a list of numbers, letters, words, pictures, or other unique objects that correspond to the wireless signals and/or the MAC addresses identified when the administrative computing device scans for uniquely identifiable computing devices. In some embodiments, the listed items may be generated and/or assigned by the administrative computing device itself, while in other embodiments, the listed items (or a portion of the listed items) may have been transferred from the uniquely identifiable computing devices to which they correspond during the scanning process. For example, numbers, letters, words, pictures, or other unique objects may be stored in the memory of a uniquely identifiable computing device, whether initially upon manufacture of the device, during initialization of the device (e.g., initial configuration after installation), or even during a subsequent configuration of the uniquely identifiable computing device. For example, when the unique object is stored to the memory of the device during or immediately after manufacture, the unique object may refer to or represent a physical feature of the device (e.g., "small green reader", "square phone", "round tablet", etc.). When the unique object is stored to the memory of the device after the device is mounted for use, the unique object may be selected based on the device's location or environment (e.g., "reader by door 1", "garage reader", "front desk computer", etc.).

Regardless of when it is stored in the memory of a uniquely identifiable computing device, a unique object preferably, although not always, provides some indication that assists the administrator in identifying the device. While visual indications are most typical, if an indication corresponding to a sense other than the visual sense is desired, then a unique object can be selected that provides an indication for the desired sense (e.g. an indication that can be heard, or an indication that can be felt).

Figure 9:
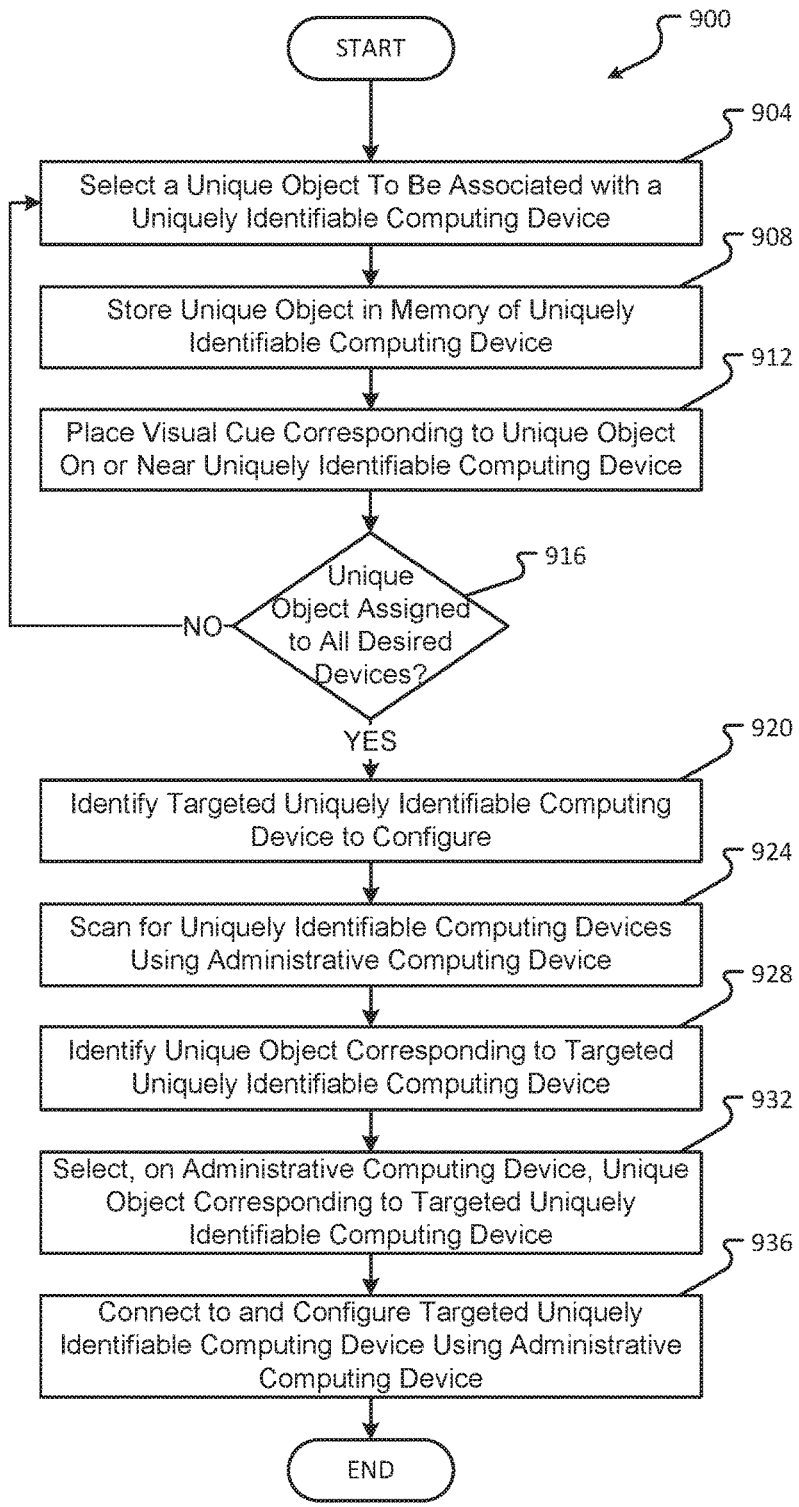
FIG. 9 is a flow diagram depicting a method according to another embodiment of the present disclosure.

FIG. 9 depicts one example of a process 900 wherein an administrator, in step 904, selects a unique object to be associated with the uniquely identifiable computing device. The unique object may correspond to the environment in which the uniquely identifiable computing device is or will be located, or to a feature of the uniquely identifiable computing device, or to some other visual cue that will enable an administrator to visually identify the uniquely identifiable computing device. The administrator stores the unique object in the memory of the uniquely identifiable computing device in step 908. (Persons of ordinary skill in the art will understand that storing the unique object in the memory of the uniquely identifiable computing device encompasses storing a digital representation or depiction of the unique object in a computer memory of the uniquely identifiable computing device.) In step 912, the administrator places a visual cue on or near the uniquely identifiable computing device that corresponds to the device's unique object. In other embodiments, it may be unnecessary to place a visual cue corresponding to the unique object on or near the uniquely identifiable computing device, because the visual cue may already be in place. For example, if the unique object corresponds to a physical feature of the uniquely identifiable computing device, or to a feature of the environment in which the uniquely identifiable computing device is located, then no additional visual cue will be necessary. Then, at step 916, the administrator determines whether all of the uniquely identifiable computing devices for which the administrator desires to utilize a unique object have been properly configured, and repeats steps 904-912 for any uniquely identifiable computing device for which a unique object has not been established.

Once a unique object has been established for each applicable uniquely identifiable computing device, the administrator can, in step 920, identify a targeted one of the uniquely identifiable computing devices to configure. Using an administrative computing device, the administrator scans for uniquely identifiable computing devices in step 924. When the administrative computing device displays the unique objects of the uniquely identifiable computing devices identified during the scanning step, the administrator can determine, in step 928, which unique object from among those displayed on the administrative computing device corresponds to the targeted uniquely identifiable computing device. The administrator selects the corresponding unique object on the administrative computing device in step 932, and then connects to and configures the targeted uniquely identifiable computing device, using the administrative computing device, in step 936.

Thus, for example, an administrator may assign a unique object corresponding to a colored shape to each of ten uniquely identifiable computing devices in a room, then place a corresponding colored shape on or near each of the ten uniquely identifiable computing devices. When the administrator then scans for uniquely identifiable computing devices using an administrative computing device, the administrative computing device will receive the unique objects from each of the 10 uniquely identifiable computing devices and display them to the administrator. If the administrator wishes to configure the uniquely identifiable computing device identified by a red circle on or near the device, the administrator can quickly find and select the red circle on the administrative computing device and know that the proper device has been selected. The administrator can then connect to and configure the administrative computing device corresponding to the red circle, using the administrative computing device.

Returning to FIG. 5, in embodiments, an administrative computing device 112 may order the device addresses (or representative objects) by signal strength, so that the first device address displayed to the administrator is more likely to be associated with the nearest device to be administered. As depicted in FIG. 6, in other embodiments, the administrative computing device 112 may order the device addresses (or representative objects) by protocol, so that uniquely identifiable computing devices using a particular wireless protocol are grouped together.

Figure 5:
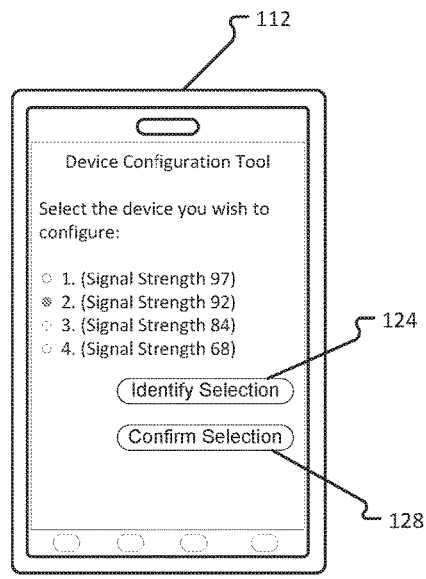
FIG. 5 is an administrative computing device displaying unique objects associated with wireless signals received by the administrative computing device according to one aspect of the present disclosure.
Figure 6:
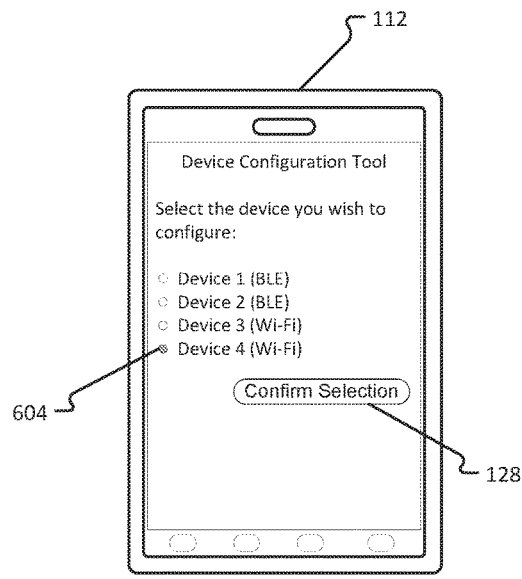
FIG. 6 is an administrative computing device displaying unique objects associated with wireless signals received by the administrative computing device according to another aspect of the present disclosure.
Figure 7:
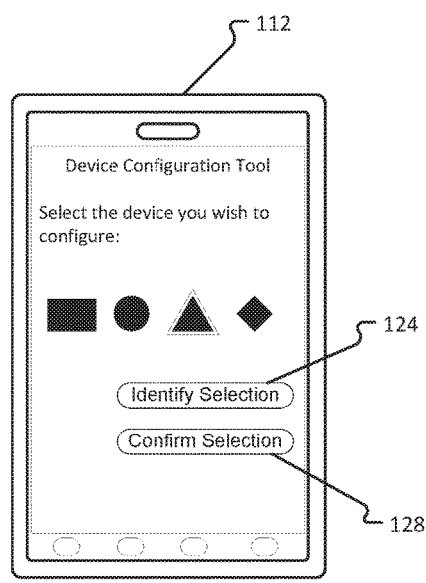
FIG. 7 is an administrative computing device displaying unique objects associated with wireless signals received by the administrative computing device according to yet another aspect of the present disclosure.
Figure 8:
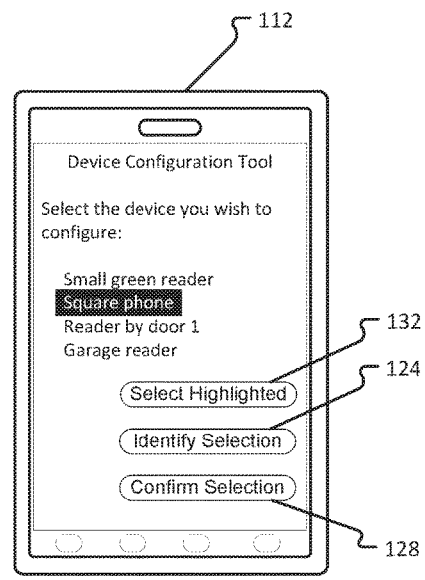
FIG. 8 is an administrative computing device displaying unique objects associated with wireless signals received by the administrative computing device according to still another aspect of the present disclosure.

In embodiments, the device addresses (or representative unique objects) may be selectable by pressing a digital button next to the desired device address, as shown, for example, in FIG. 5-6. In embodiments, the device addresses (or representative unique objects) may be selectable by pressing the desired device address (or representative unique object) itself, as shown, for example, in FIG. 7. In embodiments, the desired device address (or representative unique object) may be selected by highlighting the desired device address (or representative unique object) and then pressing a digital button (e.g., the "Select Highlighted" button 132) as shown in FIG. 8. Other means of selecting an item from a digital list are well known and any such means may be used for purposes of the present disclosure.

In embodiments, selection of a targeted device on the administrative computing device, such as by pressing a digital button associated with the device address corresponding to the targeted device (e.g. the button 604 adjacent Device 4 in FIG. 6), triggers the events that result in LEDs blinking and/or buzzers buzzing on the targeted device. In such embodiments, the administrator need only select a targeted device, determine whether the targeted device performs the identification command, and then confirm the selection (e.g. by pressing the "Confirm Selection" button 128) on the administrative computing device in order to proceed with configuring the device.

As can be seen from the above description, the method disclosed herein is useful for discovering, identifying, and configuring devices with opaque addresses, including in the Internet of Things environment. Specific details were given in the description to provide a thorough understanding of the embodiments. However, it will be understood by one of ordinary skill in the art that the embodiments may be practiced without these specific details. Further, the aspects of various embodiments described herein may be combined with one another in ways not explicitly described without departing from the scope of the present disclosure. Moreover, where methods are described, the depicted steps or a subset thereof may be performed in various orders or in parallel without departing from the scope of the present disclosure. Well-known circuits, processes, algorithms, structures, and techniques have been shown without unnecessary detail in order to avoid obscuring the embodiments.

What is claimed is:

1. A method for connecting to a specific one of a plurality of uniquely identifiable computing devices being readers of a physical access control system, the method comprising:
   scanning, with an administrative computing device, for wireless signals in wireless communication range of the administrative computing device;
   displaying, on the administrative computing device, a unique object associated with each wireless signal received from a plurality of uniquely identifiable computing devices detected during the scanning step, wherein an identification of signal type is displayed for each wireless signal received from the plurality of uniquely identifiable computing devices detected during the scanning step and wherein at least two different signal types are detected during the scanning step;
   selecting one of the unique objects displayed on the administrative computing device;
   establishing a wireless connection between the administrative computing device and the uniquely identifiable computing device that produced the wireless signal associated with the selected unique object;
   sending over the wireless connection, from the administrative computing device to the uniquely identifiable computing device, an identification command to be executed by the uniquely identifiable computing device, wherein the identification command, when executed, causes the uniquely identifiable computing device to produce an audible and/or visual output;
   determining that the uniquely identifiable computing device that produced the audible and/or visual output corresponds to a targeted device; and
   after the uniquely identifiable computing device that produced the audible and/or visual output is determined to correspond to the targeted device, enabling the administrative computing device to perform an administrative task or function with the targeted device that includes performing an initial configuration by writing appropriate security keys to the targeted device for storage by the targeted device.

2. The method of claim 1, wherein the security keys are unique to a customer that has purchased the targeted device.

3. The method of claim 1, wherein the administrative computing device is a smart phone or tablet.

4. The method of claim 1, wherein the uniquely identifiable computing devices are used to protect at least one of a door, gate, and physical access point.

5. The method of claim 1, wherein the wireless signals utilize the Bluetooth® low energy protocol.

6. The method of claim 1, wherein the wireless signals utilize a plurality of wireless protocols.

7. The method of claim 1, wherein the unique objects are ordered by the strength of the wireless signal as detected by the administrative computing device during the scanning step.

8. The method of claim 1, wherein the unique objects are MAC addresses.

9. The method of claim 1, wherein the unique object comprises an identification of a type of wireless signal and an identification of signal strength.

10. The method of claim 1, wherein the establishing a wireless connection step occurs after the selecting step without further input from a user of the administrative computing device.

11. The method of claim 1, further comprising:
    repeating the scanning, displaying, selecting, establishing, and sending steps until the targeted device performs the identification command.

12. A method for connecting to a specific reader in a physical access control system having a plurality of readers, comprising:
    scanning, with a computing device, for wireless signals from among a plurality of readers;
    receiving, on the computing device and from each of the plurality of readers, an object that uniquely identifies each reader among the plurality of readers;
    displaying, on the computing device, each unique object received from each of the plurality of readers, wherein the unique objects are displayed on the computing device in an ordered set thereby enabling a user of the computing device to select one among the plurality of readers by selecting one of the unique objects, and wherein an identification of signal type is displayed for each wireless signal received from the plurality of readers detected during the scanning and wherein at least two different signal types are detected during the scanning;
    establishing a wireless connection between the computing device and a selected reader;
    sending over the wireless connection, from the computing device to the selected reader, an identification command to be executed by the selected reader, wherein the identification command, when executed, causes the selected reader to produce an audible and/or visual output;
    determining that the selected reader that produced the audible and/or visual output corresponds to a targeted reader; and
    after the selected reader that produced the audible and/or visual output is determined to correspond to the targeted reader, enabling the computing device to perform an administrative task or function with the targeted reader that includes performing an initial configuration by writing appropriate security keys to the targeted reader for storage by the targeted reader.

13. The method of claim 12, wherein the security keys are unique to a purchaser of the targeted reader.

14. The method of claim 12, wherein the unique object is a MAC address.

15. A device for administering uniquely identifiable computing devices that correspond to readers of a physical access control system, comprising:
   a wireless communication radio;
   a graphical user interface;
   a processor; and
   a memory containing instructions for performing an administrative task and for causing the device to:
   scan for wireless signals received from among a plurality of uniquely identifiable computing devices;
   display a unique object associated with each wireless signal received from among the plurality of uniquely identifiable computing devices detected during the scanning step, wherein an identification of signal type is displayed for each wireless signal received from the plurality of uniquely identifiable computing devices detected during the scan and wherein at least two different signal types are detected during the scan;
   receive user input selecting one of the displayed unique objects;
   establish a wireless connection with the uniquely identifiable computing device that produced the wireless signal associated with the selected one of the displayed unique objects;
   send, over the wireless connection, an identification command to be executed by the uniquely identifiable computing device, wherein the identification command, when executed, causes the uniquely identifiable computing device to produce an audible and/or visual output; and
   perform the administrative task on the uniquely identifiable computing device only in response to confirmation that the uniquely identifiable computing device that produced the audible and/or visual output corresponds to a targeted device, wherein the administrative task comprises performing an initial configuration by writing appropriate security keys to the targeted device for storage by the targeted device.

16. The device of claim 15, wherein the unique object refers to or represents a physical feature of the targeted device.

17. The device of claim 15, wherein the display of unique objects is ordered according the signal strength of the wireless signal with which each unique object is associated.

* * * * *